United States Patent
Ambekar et al.

(10) Patent No.: US 9,551,322 B2
(45) Date of Patent: Jan. 24, 2017

(54) SYSTEMS AND METHODS FOR OPTIMIZING OPERATION OF A WIND FARM

(71) Applicant: General Electric Company, Schenectady, NY (US)

(72) Inventors: Akshay Krishnamurty Ambekar, Bangalore (IN); Krishnarao Dattaram Dhuri, Bangalore (IN); Siddhanth Chandrashekar, Bangalore (IN); Kalpit Vikrambhai Desai, Bangalore (IN); Anup Menon, Hyattsville, MD (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/692,115

(22) Filed: Apr. 21, 2015

(65) Prior Publication Data
US 2015/0308416 A1    Oct. 29, 2015

(30) Foreign Application Priority Data
Apr. 29, 2014   (IN) .......................... 2155/CHE/2014

(51) Int. Cl.
*G05D 3/12*  (2006.01)
*G05D 5/00*  (2006.01)
(Continued)

(52) U.S. Cl.
CPC .............. *F03D 7/048* (2013.01); *F03D 7/045* (2013.01); *F03D 9/005* (2013.01); *F03D 17/00* (2016.05);
(Continued)

(58) Field of Classification Search
CPC .......... F03D 7/048; F03D 17/00; F03D 7/045; F03D 9/005; G05D 13/048; Y02E 10/723; F05B 2270/321
See application file for complete search history.

(56) References Cited

U.S. PATENT DOCUMENTS

| 6,668,656 B2 | 12/2003 | Fernald et al. |
| 6,724,097 B1 | 4/2004 | Wobben |

(Continued)

FOREIGN PATENT DOCUMENTS

| CA | 2697431 A1 | 6/2009 |
| CN | 101852172 A | 10/2010 |

(Continued)

OTHER PUBLICATIONS

European Search Report and Opinion issued in connection with corresponding EP Application No. 15164911.8 on Sep. 25, 2015.
(Continued)

*Primary Examiner* — Ronald Hartman, Jr.
(74) *Attorney, Agent, or Firm* — GE Global Patent Operation; Douglas D. Zhang

(57) ABSTRACT

Embodiments of methods and systems for optimizing operation of a wind farm are presented. The method includes receiving new values corresponding to at least some wake parameters for wind turbines in the wind farm. The method further includes identifying new sets of interacting wind turbines from the wind turbines based on the new values. Additionally, the method includes developing a farm-level predictive wake model for the new sets of interacting wind turbines based on the new values and historical wake models determined using historical values of the wake parameters corresponding to reference sets of interacting wind turbines in the wind farm. Furthermore, the method includes adjusting one or more control settings for at least the new sets of interacting wind turbines based on the farm-level predictive wake model.

19 Claims, 6 Drawing Sheets

(51) Int. Cl.
  *G05D 9/00* (2006.01)
  *G05D 11/00* (2006.01)
  *G05D 17/00* (2006.01)
  *F03D 9/00* (2016.01)
  *H02P 9/04* (2006.01)
  *F03D 7/04* (2006.01)
  *G05B 13/04* (2006.01)

(52) U.S. Cl.
  CPC ....... *G05B 13/048* (2013.01); *F05B 2270/321* (2013.01); *Y02E 10/723* (2013.01)

(56) References Cited

U.S. PATENT DOCUMENTS

| | | | |
|---|---|---|---|
| 6,776,045 B2 | 8/2004 | Fernald et al. | |
| 6,820,489 B2 | 11/2004 | Fernald et al. | |
| 7,025,567 B2 | 4/2006 | Wobben | |
| 7,299,627 B2 | 11/2007 | Corten et al. | |
| 7,357,622 B2 | 4/2008 | Corten et al. | |
| 7,756,609 B2 | 7/2010 | Jurkat et al. | |
| 7,941,304 B2 | 5/2011 | Gundling | |
| 8,035,241 B2 | 10/2011 | Subramanian et al. | |
| 8,249,753 B2 | 8/2012 | Cleve et al. | |
| 8,606,418 B1 | 12/2013 | Myers et al. | |
| 9,086,337 B2 * | 7/2015 | Merida | F03D 7/048 |
| 2007/0124025 A1 | 5/2007 | Schram et al. | |
| 2009/0099702 A1 * | 4/2009 | Vyas | F03D 7/0292 700/287 |
| 2009/0299780 A1 | 12/2009 | Sarkar et al. | |
| 2010/0115951 A1 | 5/2010 | Pedersen | |
| 2011/0175353 A1 | 7/2011 | Egedal et al. | |
| 2011/0176926 A1 | 7/2011 | Corten | |
| 2011/0193344 A1 | 8/2011 | Lafferty et al. | |
| 2012/0133138 A1 | 5/2012 | Soerensen et al. | |
| 2013/0103202 A1 | 4/2013 | Bowyer et al. | |
| 2013/0144449 A1 * | 6/2013 | Dalsgaard | F03D 7/048 700/287 |
| 2013/0156577 A1 | 6/2013 | Esbensen et al. | |
| 2013/0166082 A1 | 6/2013 | Ambekar et al. | |
| 2013/0255363 A1 | 10/2013 | Merida et al. | |
| 2013/0300115 A1 | 11/2013 | Seem et al. | |
| 2014/0028495 A1 | 1/2014 | Schroeder et al. | |
| 2014/0028496 A1 | 1/2014 | Schroeder et al. | |
| 2014/0037447 A1 | 2/2014 | Attia | |
| 2014/0234103 A1 * | 8/2014 | Obrecht | F03D 7/0204 416/9 |
| 2014/0336833 A1 * | 11/2014 | Marinopoulos | G01W 1/10 700/291 |

FOREIGN PATENT DOCUMENTS

| | | |
|---|---|---|
| CN | 101949363 A | 1/2011 |
| CN | 102012956 A | 4/2011 |
| CN | 102235313 A | 11/2011 |
| CN | 102270256 A | 12/2011 |
| CN | 102289539 A | 12/2011 |
| CN | 102913399 A | 2/2013 |
| CN | 103020462 A | 4/2013 |
| EP | 1817496 A1 | 8/2007 |
| EP | 2028368 A2 | 2/2009 |
| EP | 2326835 A2 | 6/2011 |
| KR | 20130124028 A | 11/2013 |
| WO | 2013026538 A2 | 2/2013 |
| WO | 2013037374 A1 | 3/2013 |

OTHER PUBLICATIONS

Li Li et al., Impact of wake effect on wind power prediction, Renewable Power Generation Conference, IEEE Xplore, Sep. 9-11, 2013, pp. 1-4, Conference Location : Beijing.

Haiyan Li et al., Detection of wind farm using the relative phase of compact polarimetry SAR, Geoscience and Remote Sensing Symposium (IGARSS), 2012 IEEE International, Jul. 22-27, 2012, pp. 7636-7639, Conference Location :Munich.

* cited by examiner

SYSTEMS AND METHODS FOR OPTIMIZING OPERATION OF A WIND FARM

BACKGROUND

Embodiments of the present disclosure relate generally to wind turbines, and more particularly to methods and systems for optimizing operation of a wind farm.

Renewable energy resources are increasingly employed as cleaner and cost-efficient alternatives to fossil fuels for supplying global energy requirements. Wind energy, in particular, has emerged as one of the most favored renewable energy resources on account of being plentiful, renewable, widely distributed, and clean. Generally, wind energy may be harnessed by wind turbines that are designed to produce electrical energy in response to a wide spectrum of wind speeds. These wind turbines are typically located in a wind farm spread across a specific geographical region such that the wind passing over the region causes the blades associated with the wind turbines to rotate. Each of the rotating blades, in turn, causes a rotor of an associated generator to turn, which aids in generating electrical power.

Traditionally, wind farms are controlled in a decentralized fashion to generate power such that each turbine is operated to maximize local power output and to minimize impacts of local fatigue and extreme loads. However, in practice, such independent optimization of the wind turbines ignores farm-level performance goals, thereby leading to sub-optimal performance at the wind farm-level. For example, independent optimization of the wind turbines may not account for aerodynamic interactions such as wake effects between neighboring turbines within the wind farm that may affect a farm-level power output.

Typically, wake effects include a reduction in wind speed and increased wind turbulence at a downstream wind turbine due to a conventional operation of an upstream wind turbine. The reduced wind speed causes a proportional reduction in a power output of the downstream wind turbine. Moreover, the increased turbulence increases the fatigue loads placed on the downstream wind turbine. Several studies have reported a loss of more than 10% in the annual energy production (AEP) of the wind farm owing to the wake effects between neighboring independently optimized wind turbines within the wind farm.

Accordingly, some currently available approaches attempt to optimize power generation at the wind farm-level by mitigating an impact of the wake effects through a coordinated control of the wind turbines in the wind farm. Typically, mitigating the wake effects involves accurately modeling the wake effects experienced at different wind turbines in the wind farm. For example, empirical or semi-empirical thrust-based, and/or high fidelity physics-based models may be used to model the wake effects between the aerodynamically interacting wind turbines in the wind farm.

Conventionally, the empirical or semi-empirical models (engineering wake models) are generated based on field-experiment data and/or historical wind information. Accordingly, these models may be used to design the layouts of wind farms so as to optimize one or more performance goals before installation of the wind turbines. Alternatively, these models may be used to optimize performance of the wind farm subsequent to the installation.

One optimization approach, for example, employs the engineering wake models to determine control settings for the wind turbines. Particularly, the engineering wake models determine the control settings so as to operate upstream turbines at lower efficiencies, which in turn, allows for greater energy recovery at the downstream turbines. Another approach uses the engineering wake models for adjusting a yaw alignment of the upstream turbines relative to an incoming wind direction to steer the resulting wake effects away from the downstream turbines.

However, the conventional engineering models do not account for prevailing wind inflow and other ambient conditions such as atmospheric boundary layer stability and longitudinal turbulence intensity. As the ambient conditions over the wind farm tend to change frequently, the wake models estimated using the engineering wake models may be inaccurate for use during real-time implementation. Inaccurate modeling of the wake conditions, in turn, may result in use of incorrect control settings for the wind turbines in the wind farm. Thus, the conventional optimization approaches using the engineering wake models usually provide only a marginal improvement in the farm-level performance output.

Accordingly, hi-fidelity wake models, for example, based on computational fluid dynamics modeling have been explored to provide greater accuracy in modeling wake interactions. The hi-fidelity models entail measurement and analysis of a wide variety of parameters that necessitate additional instrumentation, complex computations, and associated costs. The cost and complexity associated with the hi-fidelity models, therefore, may preclude wider use of these models in every turbine in the wind farm and/or for real time optimization of wind farm operations.

BRIEF DESCRIPTION

In accordance with one aspect of the present disclosure, a method for optimizing operation of a wind farm is presented. The method includes receiving new values corresponding to at least some wake parameters for wind turbines in the wind farm. The method further includes identifying new sets of interacting wind turbines from the wind turbines based on the new values. Additionally, the method includes developing a farm-level predictive wake model for the new sets of interacting wind turbines based on the new values and historical wake models determined using historical values of the wake parameters corresponding to reference sets of interacting wind turbines in the wind farm. Furthermore, the method includes adjusting one or more control settings for at least the new sets of interacting wind turbines based on the farm-level predictive wake model.

In accordance with a further aspect of the present disclosure, another method for operating a wind farm is disclosed. The method includes assembling historical wake models for different sets of interacting wind turbines in the wind farm based on historical values of selected combinations of wake parameters corresponding to the sets of interacting wind turbines. Moreover, the method further includes determining optimal control settings for each wind turbine in the sets of interacting wind turbines for each of the selected combinations of wake parameters based on the historical wake models. Additionally, the method includes storing the optimal control settings for each wind turbine as a function of the selected combination of wake parameters. The method further includes receiving the new values of the wake parameters acquired over a subsequent period of time following acquisition of the historical values. Furthermore, the method includes determining the control settings for the wind turbines in each of the new sets of wind turbines using the new values and the stored control settings.

In accordance with yet another aspect of the present disclosure, a system for optimizing operation of a wind farm is presented. The system includes a plurality of wind turbines, one or more monitoring devices configured to measure values of a plurality of wake parameters for one or more of the plurality of wind turbines, and a farm control subsystem operatively coupled to at least the monitoring devices. The farm control subsystem is programmed to receive new values corresponding to at least some wake parameters for the plurality of wind turbines in the wind farm. The farm control subsystem is further programmed to identify new sets of interacting wind turbines from the plurality of wind turbines based on the new values. Moreover, the farm control subsystem is programmed to develop a farm-level predictive wake model for the new sets of interacting wind turbines based on the new values and historical wake models determined using historical values of the wake parameters corresponding to reference sets of interacting wind turbines in the wind farm. Additionally, the farm control subsystem is programmed to adjust one or more control settings for at least the new sets of interacting wind turbines based on the farm-level predictive wake model.

DRAWINGS

These and other features and aspects of embodiments of the present disclosure will become better understood when the following detailed description is read with reference to the accompanying drawings in which like characters represent like parts throughout the drawings, wherein.

DETAILED DESCRIPTION

Figure 1:
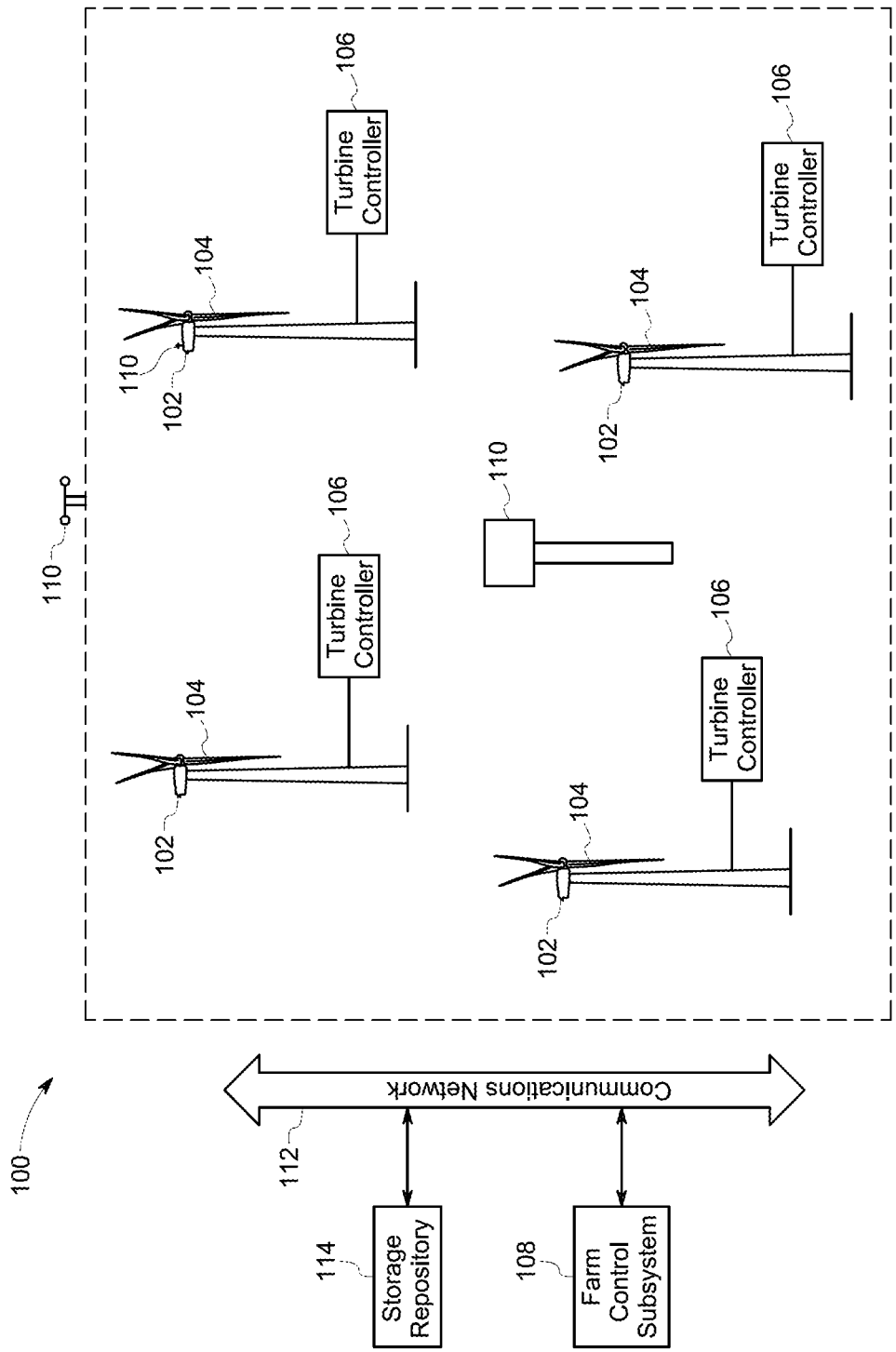
FIG. 1 is a diagrammatical illustration of an exemplary wind farm, according to embodiments of the present disclosure.

The following description presents exemplary embodiments of systems and methods for optimizing operation of a wind farm. Particularly, embodiments illustrated herein disclose a method for data-driven modeling of wake effects by leveraging data conventionally aggregated by a supervisory control and data acquisition (SCADA) server at the wind farm. The aggregated data may include wake parameters including ambient conditions, geometrical layout of the wind farm, and/or operational information corresponding to the wind turbines. At least some of the wake parameters such as the geometrical layout may be known or received once, whereas some other wake parameters such as the ambient conditions may be continually monitored to aid in estimating the wake effects at the wind-farm-level.

The ambient conditions, for example, may include prevailing wind direction, wind speed detected at an upstream wind turbine (upstream wind speed), wind speed detected at a downstream wind turbine (downstream wind speed), wind shear, wind veer, temperature, humidity, and/or pressure. The wake parameters may further include operational information and control settings such as a tip speed ratio, a pitch angle, a yaw alignment, a generator speed, a power output, a torque output, a thrust measurement, and/or operational states of individual wind turbines that provide information regarding any wind turbines in the wind farm that are not producing power. Additionally, the wake parameters may also include known geometric layout of the wind farm including information corresponding to terrain of the wind farm, number of neighboring turbines, actual turbine locations, and/or relative locations of the downstream and upstream wind turbines.

Further, embodiments of the present disclosure present a data-driven approach that uses the monitored values of wake parameters for generating robust farm-level wake models. Specifically, the data-driven approach uses the wake parameters to identify aerodynamically interacting sets of wind turbines and estimate corresponding (set-wise) wake interactions. The set-wise wake interactions, in turn, are used to generate the farm-level wake models in real-time. Use of prevailing ambient conditions and current operational states of individual turbines enables detection of wake interactions being experienced in real-time at the downstream wind turbines, thereby allowing for determination of a more accurate farm-level predictive wake model.

Additionally, determining the farm-level wake model through a set-wise evaluation of the wake interactions reduces computational effort, thus allowing for real-time optimization of one or more selected performance goals for the wind farm. Specifically, the farm-level wake model aids in determining optimal control settings for the different wind turbines in the wind farm so as to significantly optimize overall performance goals such as maximizing annual energy production (AEP) or minimizing fatigue loads experienced by the wind turbines in the wind farm.

Although exemplary embodiments of the present systems and methods are described in the context of optimizing different performance goals for a wind farm, it will be appreciated that use of the embodiments of the present system in various other applications is also contemplated. By way of example, certain embodiments of the present disclosure may be employed for optimizing operations of a plurality of tidal or hydel turbines in underwater systems. An exemplary environment that is suitable for practicing various implementations of the present system is discussed in the following sections with reference to FIG. 1.

FIG. 1 illustrates an exemplary wind farm 100 according to aspects of the present disclosure. In one embodiment, the wind farm 100 includes a plurality of wind turbines 102 arranged in a desired geometrical layout. For example, the wind turbines 102 may be arranged randomly, in a single row, or in an array of rows and columns using one or more layout optimization algorithms. Generally, the optimization algorithms may be designed to maximize positive effects of expected wind velocity and direction on the performance goals such as AEP, while minimizing negative effects such as an increase in fatigues loads associated with each of the individual wind turbines 102.

In one embodiment, each of the wind turbines 102 includes one or more energy conversion modules such as rotor blades 104, a step-up gearbox (not shown), and a power generator (not shown) that converts wind energy into usable electrical energy. Additionally, the wind turbines 102 also include blade pitch mechanisms (not shown) to regulate turbine power output and rotor speed, yaw mechanisms (not shown), and one or more monitoring devices 110 that work cohesively with other components of the wind turbines 102 to swivel and align the rotor blades 104 in line and/or or relative to the prevailing wind direction. Moreover, the wind turbines 102 may also include cooling units (not shown) to prevent components of the wind turbines 102 from overheating, braking systems (not shown) to stop the rotor blades 104 from rotating when desired, and nacelles (not shown) for protecting the different components of the wind turbines 102 from environmental factors.

Typically, the rotor blades 104 of the wind turbines 102 are aligned in a substantially similar direction, for example, the direction of incoming wind during operation of the wind turbine 102. Such a blade alignment, however, positions certain downstream wind turbines 102 behind certain upstream wind turbines 102 in the wind farm 100, thus resulting in wake effects that adversely impact operations of the downstream wind turbines 102. For example, the wind blowing across the rotor blades 104 of upstream wind turbines 102 causes rotation of the corresponding blades 104. The rotating blades 104 convert at least some of the kinetic energy of the incoming wind into mechanical energy, thus reducing the wind speed experienced at the downstream wind turbine 102, while further increasing the turbulence.

Since power output of wind turbines 102 is proportional to incoming wind velocity, a reduction in wind speed at the downstream wind turbine 102 owing to the wake effects reduces a corresponding power output. Additionally, the turbulence caused by the wake effects may damage turbine components due to cyclical fatigue loading. For example, fatigue loading may initiate small cracks on surfaces of the turbine components that may increase in size and propagate, thus potentially leading to failure of the downstream wind turbine 102.

Moreover, as independent optimization of the wind turbines may further aggravate wake effects, it is desirable to configure operation of the wind turbines 102 such that the farm-level power output, AEP, and/or fatigue loads in the wind farm 100 remain within corresponding designated thresholds. Particularly, it is desirable to continually adjust the control settings of each of the interacting wind turbines 102 based on varying values of wake parameters such as wind velocity and direction in real-time such that farm-level performance goals are consistently achieved.

Accordingly, each of the wind turbines 102 includes one or more turbine controllers 106 that regulate the operation of the corresponding wind turbines 102 to mitigate the wake effects between sets of interacting wind turbines 102. In one embodiment, the turbine controllers 106 regulate the operation of the wind turbines 102 based on ambient conditions, user-inputs, and/or commands received from an associated farm control subsystem 108. Accordingly, the turbine controllers 106 may include application-specific processors, programmable logic controller (PLC), digital signal processors (DSPs), microcomputers, microcontrollers, Application Specific Integrated Circuits (ASICs) and/or Field Programmable Gate Arrays (FPGAs).

Furthermore, the turbine controllers 106 may be communicatively coupled to the farm control subsystem 108 and/or a plurality of monitoring devices 110 via a wired and/or wireless communications network 112. The communications network 112, for example, may include the Internet, a local area network (LAN), wireless local area networks (WLAN), wide area networks (WAN) such as Worldwide Interoperability for Microwave Access (WiMax) networks, satellite networks, cellular networks, sensor networks, ad hoc networks and/or short-range networks.

Moreover, the monitoring devices 110, for example, include encoders or sensors that provide direct or indirect measurement of wake parameters such as wind speed, wind direction, ambient temperature, pressure, density, turbulence, wind shear, and/or power output of the wind turbines 102. In certain embodiments, the monitoring devices 110 may be positioned within and/or outside the wind farm 100 to measure wake parameters such as SCADA information including wind experienced and/or expected at the different wind turbines 102. In one embodiment, for example, the monitoring devices 110 may be disposed on or proximal the wind turbines 102 to measure SCADA information corresponding to ambient conditions. The SCADA information may be used by the turbine controllers 106 and/or the farm control subsystem 108 to continually estimate the aerodynamic interactions between sets of interacting wind turbines 102. The estimated aerodynamic interactions or wake effects, in turn, may be used to determine optimal control settings for the sets of the interacting wind turbines 102 in real-time.

In one embodiment, the monitoring devices 110 may be configured to store the SCADA information in a storage repository 114 for later processing. To that end, the storage repository 114 may be communicatively coupled to the turbine controllers 106, the farm control subsystem 108, and/or the monitoring devices 110 over the communications network 112. Further, the storage repository 114, for example, includes one or more hard disk drives, floppy disk drives, compact disk-read/write (CD-R/W) drives, Digital Versatile Disc (DVD) drives, flash drives, optical drives, and/or solid-state storage devices for storing the SCADA information.

In an alternative embodiment, the monitoring devices 110 may be configured to communicate the SCADA information to the turbine controllers 106 and/or the farm control subsystem 108 at one or more designated intervals of time. In certain further embodiments, the monitoring devices 110 may be configured to communicate the SCADA information to the turbine controllers 106 and/or the farm control subsystem 108 at random intervals, upon receiving a user request, and/or upon determining a significant change (for example, a change of more than 5%) in consecutive measurements.

In certain embodiments, the farm control subsystem 108 may be configured to use the SCADA information received from the turbine controllers 106 to supervise and/or control the operations of the turbine controllers 106 and/or the wind turbines 102. To that end, the farm control subsystem 108 may include, for example, one or more application-specific processors, DSPs, microcomputers, microcontrollers, PLCs, ASICs, and/or FPGAs. Although FIG. 1 illustrates the farm control subsystem 108 as a single centralized server, in an alternative embodiment, the farm control subsystem 108 may correspond to a distributed system.

Further, in one embodiment, the farm control subsystem 108 uses the SCADA information along with a geometrical layout of the wind farm 100 to model inter-turbine wake interactions based on prevailing ambient conditions. For example, the farm control subsystem 108 may employ a data-driven wake modeling approach that fits a predictive regression model to the SCADA information that is conventionally aggregated in the wind farm 100. Typically, a regression model defines a statistical relationship that may be used to indicate a change in a dependent variable when one or more independent variables are varied, while other independent variables are held fixed. However, a predetermined statistical relationship between wake parameters may not hold true for new and subsequently acquired values of the wake parameters.

Accordingly, in one embodiment, the predetermined statistical relationship may undergo machine learning and subsequent validation with additional wake parameter values. Specifically, in certain embodiments, the training and validation continues until accurate characterization of the real-time wake interactions between sets of interacting wind turbines 102 using the statistical relationship reaches a steady state. Once the steady state is reached, the farm control subsystem 108 identifies sets of aerodynamically interacting wind turbines from newly acquired SCADA information and uses the statistical relationship to determine set-wise wake models for each set of upstream and downstream wind turbines 102 in the wind farm 100.

In certain embodiments, the set-wise wake models may be configured to formulate an optimization problem for turbine control settings based on one or more prediction variables, desired performance goals, and/or known constraints. For example, in one embodiment, the regression model may aid in determining optimal control settings for the wind turbines 102 based on an operating regime of the wind turbines 102. Typically, at low wind speeds, the wind turbines 102 operate in a variable speed mode, while operating in a rated speed and power mode at high wind speeds. The farm control subsystem 108 may determine the operating regime based on current wind information, turbine rotor speed, pitch angle, and/or power collected as part of the SCADA information.

Based on the operating regime, in one embodiment, the farm control subsystem 108 may be configured to determine optimal values of one or more prediction variables corresponding to the performance goals in view of one or more known operational constraints. As used herein, the term "prediction variables" may be used to refer to values that may be manipulated in order to arrive at the optimal value of the performance goal and while satisfying the operational constraints. In one embodiment, the prediction variables include control settings for the wind turbines 102 such as a tip speed ratio and blade pitch angles. Generally, different sets of prediction variables may be used for influencing wind turbine 102 behavior in different operating regimes and conditions.

For example, when operating in the variable speed mode, the regression model may use the fine pitch angle and/or tip speed ratio set points as the prediction variables. As used herein, the term "fine pitch angle" set point corresponds to the pitch angle at which the rotor blades 104 are locked during the variable speed mode, and the term "tip speed ratio set-point" corresponds to control set points used to achieve a required tip speed ratio during turbine operation. Generally, the tip speed ratio may be defined as the ratio of a linear speed of the blade tip to a power-equivalent wind speed.

However, when operating the wind turbines 102 in the rated power mode, the farm control subsystem 108 may use the turbine power set point and rotor speed set point as the prediction variables. In one embodiment, the prediction variables for the regression model aid in determining the performance of a wind turbine such as its power output, fatigue loads, and downstream wake effects in view of prevailing wind conditions.

Generally, the wake effects experienced at a downstream turbine 102 result not only from the operation of a corresponding upstream turbine 102 but also from operation of other wind turbines 102 and surrounding terrain in the wind farm 100. Typically, owing to the size and layout of the wind farm 100, the wake effects cascade from an upstream wind turbine 102 to two or more downstream wind turbines 102 that are located in the path of the incoming wind. Accordingly, the farm control subsystem 108 may develop a farm-level predictive wake model based on the determined set-wise wake models to provide a more comprehensive estimation of the overall wake effects in the wind farm 100. As previously noted, use of prevailing ambient conditions and operational states of individual turbines allows capture of wake interactions being experienced in real-time at the downstream wind turbines, thereby allowing for determination of a more reliable predictive farm-level wake model. Additionally, determining the farm-level wake model through a set-wise evaluation of the wake interactions reduces the computational effort, thus allowing for real-time optimization of one or more selected performance goals for the wind farm. Certain exemplary embodiments of methods for determining the set-wise wake models and the farm-level predictive wake model will be described in greater detail with reference to FIGS. 2-5.

In one embodiment, the farm-level wake model may be used to predict expected wake interactions between sets of interacting wind turbines 102 for prevailing ambient conditions and different combinations of control settings such as the pitch angle and/or the tip speed ratio set point. Accordingly, in one embodiment, the farm-level wake model may be used to determine and adjust one or more control settings for each of the aerodynamically interacting wind turbines 102. The control settings, for example, include a tip speed ratio set point, a yaw-misalignment, a fine pitch set point, and/or a rotor speed set point. Specifically, the farm control subsystem 108 adjusts the control settings for one or more wind turbines 102 in the wind farm 100 so as to achieve one or more desired performance goals. For example, in one embodiment, the farm control subsystem 108 may adjust the pitch angle of a rotor blade, modify a generator torque, modify a generator speed, alter a yaw of a nacelle, brake one or more wind turbine components, add or activate an airflow, and/or modify an element on a surface of the rotor blade to achieve the desired performance goals.

Particularly, in one embodiment, the farm control subsystem 108 uses the farm-level predictive wake model to adjust the control settings of the wind turbines 102 to maximize the farm-level power output and/or the AEP in view of varying ambient conditions. In another example, the farm control subsystem 108 uses the farm-level predictive wake model to selectively adjust the control settings of the wind turbines 102 to minimize turbine fatigue loads. Alternatively, the farm control subsystem 108 uses the farm-level predictive wake model to selectively adjust one or more control settings of the wind turbines 102 for a constrained optimization of the desired performance goals such as optimizing the AEP, while maintaining fatigue loads on individual wind turbines 102 below a designated threshold. Certain exemplary embodiments of methods for adjusting control settings of the wind turbines 102 for optimizing one or more performance goals based on the predictive farm-level wake model will be described in greater detail with reference to FIGS. 2-5.

Figure 2:
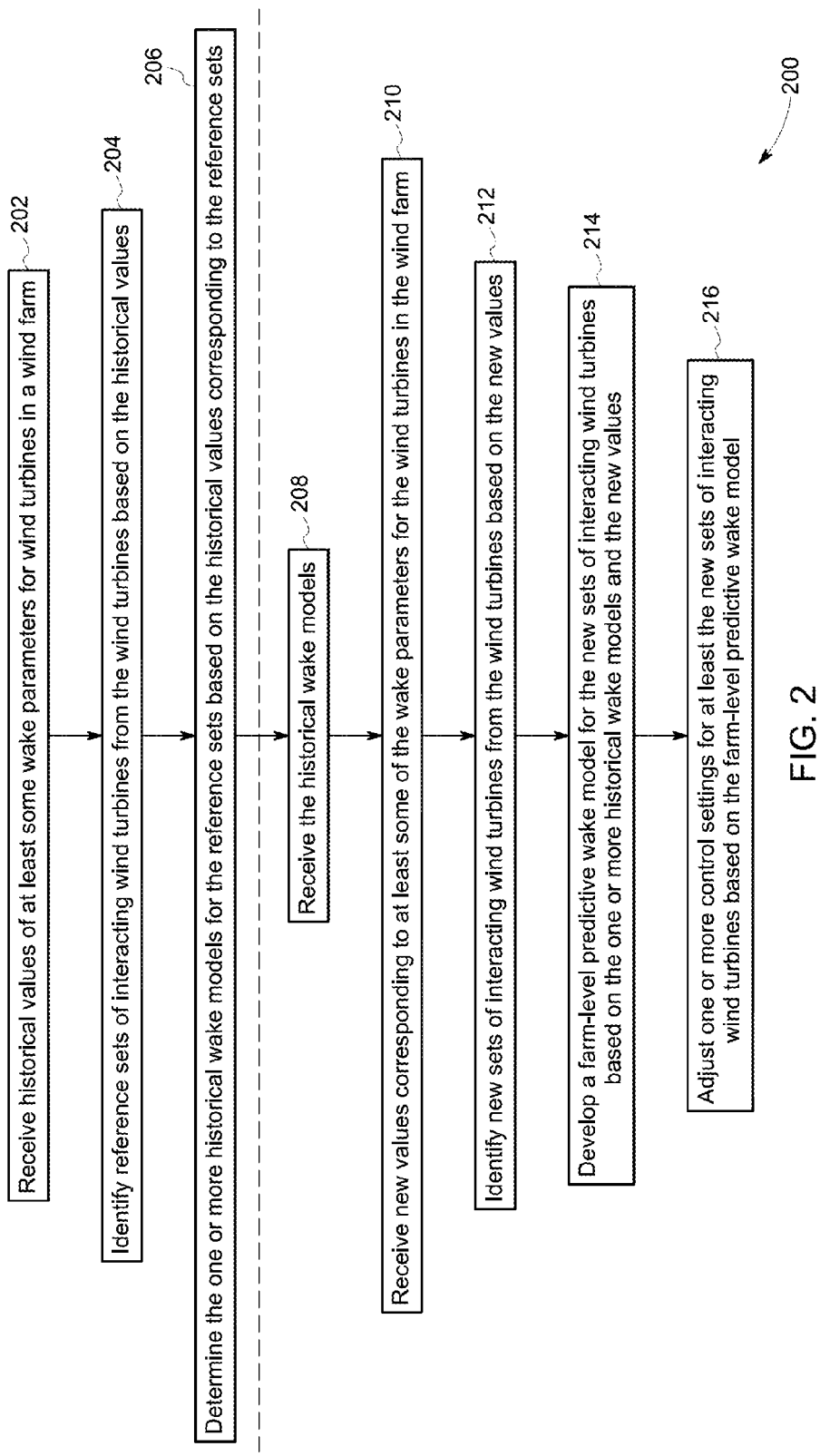
FIG. 2 is a flow chart illustrating an exemplary method for optimizing operation of a wind farm, according to embodiments of the present disclosure.

FIG. 2 illustrates a flow chart 200 depicting an exemplary method for optimizing operation of a wind farm. In the present specification, embodiments of the exemplary method may be described in a general context of non-transitory computer executable instructions on a computing system or a processor. Generally, computer executable instructions may include routines, programs, objects, components, data structures, procedures, modules, functions, and the like that perform particular functions or implement particular abstract data types.

Additionally, embodiments of the exemplary method may also be practiced in a distributed computing environment where optimization functions are performed by remote processing devices that are linked through a wired and/or wireless communication network. In the distributed computing environment, the computer executable instructions may be located in both local and remote computer storage media, including memory storage devices.

Further, in FIG. 2, the exemplary method is illustrated as a collection of blocks in a logical flow chart, which represents operations that may be implemented in hardware, software, or combinations thereof. The various operations are depicted in the blocks to illustrate the functions that are performed, for example, during steps of receiving one or more historical wake models, developing a farm-level predictive wake model, and/or adjusting one or more control settings in the exemplary method. In the context of software, the blocks represent computer instructions that, when executed by one or more processing subsystems, perform the recited operations.

The order in which the exemplary method is described is not intended to be construed as a limitation, and any number of the described blocks may be combined in any order to implement the exemplary method disclosed herein, or an equivalent alternative method. Additionally, certain blocks may be deleted from the exemplary method or augmented by additional blocks with added functionality without departing from the spirit and scope of the subject matter described herein. For discussion purposes, the exemplary method will be described with reference to the elements of FIG. 1.

As previously noted, operation of upstream turbines reduces the wind speed and increases turbulence intensity at downstream wind turbines in a wind farm such as the wind farm 100 of FIG. 1. Such aerodynamic interactions between upstream and downstream wind turbines correspond to wake effects, which typically reduce power output and useful life of the downstream wind turbine components. Conventional techniques employ hi-fidelity models or simplified engineering wake models based on physics or empirical data to model the wake interactions between different wind turbines in the wind farm. The estimated wake interactions are then used to adaptively control settings such as a rotor speed and/or an alignment of blades of the upstream wind turbines. The cost and computational expenses associated with the hi-fidelity models, however, preclude use of the hi-fidelity models on a large scale. Furthermore, as the conventional engineering models ignore real-time information corresponding to prevailing un-modeled ambient conditions and/or turbine performance, the engineering wake models manage to provide only marginal improvement in performance goals of a wind farm.

In contrast, embodiments of the present disclosure present an exemplary method for accurately modeling the farm-level wake effects based on a recursive data-driven regression model to provide superior performance as compared to conventional operations of a wind turbine. The method begins at step 202, where historical values of at least some wake parameters for wind turbines in a wind farm are received. In one embodiment, the historical values correspond to monitored values of wake parameters aggregated by a SCADA server such as the farm control subsystem 108 of FIG. 1 for a designated period of time, for example, a few days, a few hours, or a few minutes. The wake parameters, as previously noted, include ambient conditions, control settings for individual wind turbines, the geometric layout of the wind farm, and/or any parameter that may affect operational efficiency of the individual wind turbines and/or the overall wind farm. In certain embodiments, only certain wake parameters such as the upstream wind speed, the downstream wind speed, the wind direction, control settings, and/or operating or non-operating states of the turbines are received continually. Other wake parameters such as the geometrical layout of the wind farm may be received only once or may be retrieved from an associated storage device such as the storage repository 114 of FIG. 1.

Further, at step 204, a reference set of interacting wind turbines is identified from the wind turbines based on the historical values. Particularly, in one embodiment, a farm control subsystem such as the farm control subsystem 108 of FIG. 1 may be configured to identify the reference sets of interacting wind turbines based on the prevailing wind direction and the geometrical layout of the wind farm. Additionally, the farm control subsystem uses the geometrical layout of the wind farm to determine neighboring turbines and/or relative positions of the wind turbines for a detected wind direction. The relative positions, in turn, may allow identification of sets of interacting wind turbines such that each set includes at least one upstream wind turbine and at least one downstream wind turbine experiencing the wake effects.

Alternatively, in certain embodiments, the farm control subsystem may employ an engineering wake model such as the Jensen or Ainslie model to identify the sets of aerodynamically interacting wind turbines. Generally, the Jensen or Ainslie models may identify the reference sets of interacting wind turbines, for example, based on relative locations of neighboring turbines, a coefficient of thrust of each wind turbine 102, and/or the prevailing wind conditions. Specifically, the Jensen Model may predict a velocity deficit at the downstream wind turbine, for example, based on a wind speed, a wind direction, and a thrust coefficient corresponding to the upstream wind turbine, and a location of the downstream wind turbine. The velocity deficit is representative of wake interactions between two wind turbines, and thus, aids in identifying the reference sets of interacting wind turbines.

Moreover, at step 206, one or more historical wake models for the reference sets of interacting wind turbines are determined based on the historical values corresponding to the reference sets. As used herein, the terms "set" or "sets" are used to refer to a group of two or more quantities. Particularly, in one embodiment, each of the sets of wind turbines corresponds to a pair of wind turbines. In other embodiments, however, each of the sets may include three or more wind turbines. It may be noted that wake effects occur in a set-wise manner between sets of interacting downstream and corresponding upstream turbines for a particular wind direction. A set-wise estimation of the wake effects is then aggregated to provide an estimation of the farm-level wake effect. This set-wise estimation is determined using the one or more historical wake models generated for each reference set.

Accordingly, in one embodiment, historical values corresponding to each reference set are segregated from the received historical values to determine the historical wake models. In one embodiment, the reference sets may be identified using the engineering wake models. Further, for each of the reference sets, the segregated historical values provide, for example, predetermined values of different combinations of wake parameters such as wind direction, wind speed at upstream and downstream wind turbines, the pitch angle, the yaw misalignment, and/or tip speed ratio of the upstream wind turbine.

Although, several wake parameters may be simultaneously monitored in a wind farm, in the present disclosure, different subsets of wake parameters may be selected for different operating conditions, such as during day or night time, during calm or storm conditions, and/or for optimizing different performance goals. In one exemplary implementation that aims to maximize a farm-level power output, the subset of wake parameters include values corresponding to a pitch angle, tip speed ratio, and wind speed corresponding to the upstream wind turbine, and a wind speed at a corresponding downstream turbine segregated for each reference set. In one embodiment, the wind speeds may be directly measured or estimated from turbine power, rotor speed and pitch angle measurements. In certain embodiments, the segregated values are processed to filter out noisy data such as when the tip speed ratio is above or below designated thresholds to provide for more accurate modeling of the historical values of the wake parameters.

Further, in a presently contemplated embodiment, the farm control subsystem fits a regression model across the segregated values corresponding to each reference set to determine set-wise historical wake models for different combinations of wake parameters. In certain embodiments, the regression model employs machine learning to determine a statistical relationship between values of one or more selected wake parameters and a prevailing wind speed and direction at the upstream and downstream wind turbines in each reference set.

Particularly, in one example, the farm control subsystem fits the regression model across the segregated values corresponding to each reference set using equation (1)

$$\frac{V_{down}}{V_{up}} = f(\beta, s, TSR_{up}, \theta_{up}, \varphi_{up}, \text{others}) \quad (1)$$

where $V_{down}$ corresponds to the wind speed at the downstream wind turbine, $V_{up}$ corresponds to the wind speed at the upstream wind turbine, $\beta$ corresponds to a relative direction of the wind, s corresponds to a relative distance between the upstream and the downstream wind turbine in each set of interacting wind turbines, $TSR_{up}$ corresponds to the tip speed ratio of the upstream wind turbine, $\theta_{up}$ corresponds to the pitch angle of the upstream wind turbine, and $\varphi_{up}$ corresponds to a yaw misalignment of the upstream wind turbine.

In one embodiment, equation (1) defines a transfer function that allows prediction of the set-wise wake interactions as a ratio of wind velocity at the downstream wind turbine to the wind velocity at the upstream wind turbine. Specifically, the regression model estimates the ratio as a function of the upstream wind direction $\beta$, the relative distance s between the upstream and the downstream wind turbines, the tip speed ratio of upstream turbine $TSR_{up}$, the pitch angle $\theta_{up}$ of the upstream wind turbine, and yaw misalignment $\varphi_{up}$ of the upstream wind turbine.

In certain embodiments, the regression model may undergo machine learning to fine tune the transfer function to provide accurate prediction of the ratio of the wind speed at the downstream and upstream wind turbines. The farm control subsystem may then use a power model (turbine power as function of wind speed and control settings) to forecast farm-level power output from the wind speeds predicted by the historical wake models. In one embodiment, the steps corresponding to receiving historical values, identifying reference sets, and/or determining historical wake models may be performed in an offline mode, while the remaining steps illustrated in FIG. 2 may be performed in real-time. In an alternative embodiment, however, all the steps of the method illustrated in FIG. 2 may be performed in real-time.

In one embodiment, the historical values of the wake parameters, the historical wake models, and/or the predicted wind speed ratios may be stored in a lookup table in the associated storage repository. Further, at step 208, the historical wake models are received, for example, at the farm control subsystem for use in subsequent optimizations. Particularly, in one embodiment, the farm control subsystem receives the historical wake models from the wind turbines, the turbine controllers, and/or the storage repository.

Additionally, at step 210, new values corresponding to at least some of the wake parameters for the wind turbines in the wind farm are received. As previously noted, the ambient conditions in the wind farm, such as wind speed and direction tend to continually vary over a day. The wake effects experienced in the wind farm, thus, may also vary throughout the day, thereby meriting continual adjustment of the control settings. The continual adjustment of the control settings, in turn, necessitates further evaluation of new values of the wake parameters.

Accordingly, in certain embodiments, the new values, for example corresponding to wind speed and direction, may be received at the farm control subsystem at designated intervals of time such as every ten minutes. Alternatively, the new values may be received at random intervals, upon receiving a user request, upon determining a significant change (for example, a change of more than 5%) in consecutive measurements of the values of the wake parameters, and/or if a value of at least one wake parameter is outside a determined threshold. In one embodiment, for example, the new values may be received if a change of more than 0.5 meters/second in wind speed or more than 5 degrees in wind direction is observed.

Moreover, at step 212, new sets of interacting wind turbines are identified from the wind turbines based on the new values. In one embodiment, the new sets of the interacting wind turbines may be identified for a particular wind direction using the method previously described with reference to step 204.

Furthermore, at step 214, a farm-level predictive wake model may be developed for the new sets of interacting wind turbines based on the one or more historical set-wise wake models and the new values. In one embodiment, the new values corresponding to each new set of interacting wind turbines are segregated. Further, the farm control subsystem develops a predictive regression model based on the segregated values corresponding to each new set and the historical wake models. In one embodiment, the farm control subsystem adapts the transfer functions corresponding to the historical wake models to develop the farm-level predictive model based on the new values. Alternatively, the farm control subsystem aggregates the historical wake models to develop the farm-level predictive model based on the new values. The farm-level predictive model, thus developed, may be used to provide a robust estimate of the wake interactions, for example, a predicted ratio of prevailing downstream to upstream wind speed for use in determining suitable optimizations in the operation of the wind farm.

At step 216, one or more control settings for at least the new sets of interacting wind turbines are adjusted based on the farm-level predictive wake model. Particularly, the farm-level predictive wake model may provide a forecast of how a change in certain control settings for upstream wind turbines in each new set may affect operational efficiency of at least corresponding downstream wind turbines. Accordingly, the farm-level predictive wake model may be used to determine the control settings for each wind turbine such that a desired farm-level performance goal may be achieved and/or maintained.

However, simultaneously determining the control settings for every wind turbine in the wind farm is a complex and computationally intensive process that may be difficult to implement in real-time due to the large number of parameters that need to be evaluated. Accordingly, in a presently contemplated embodiment, the farm control subsystem sequentially and progressively determines one or more control settings for each wind turbine in at least the new sets of interacting wind turbines to optimize farm-level performance goals.

Figure 3:
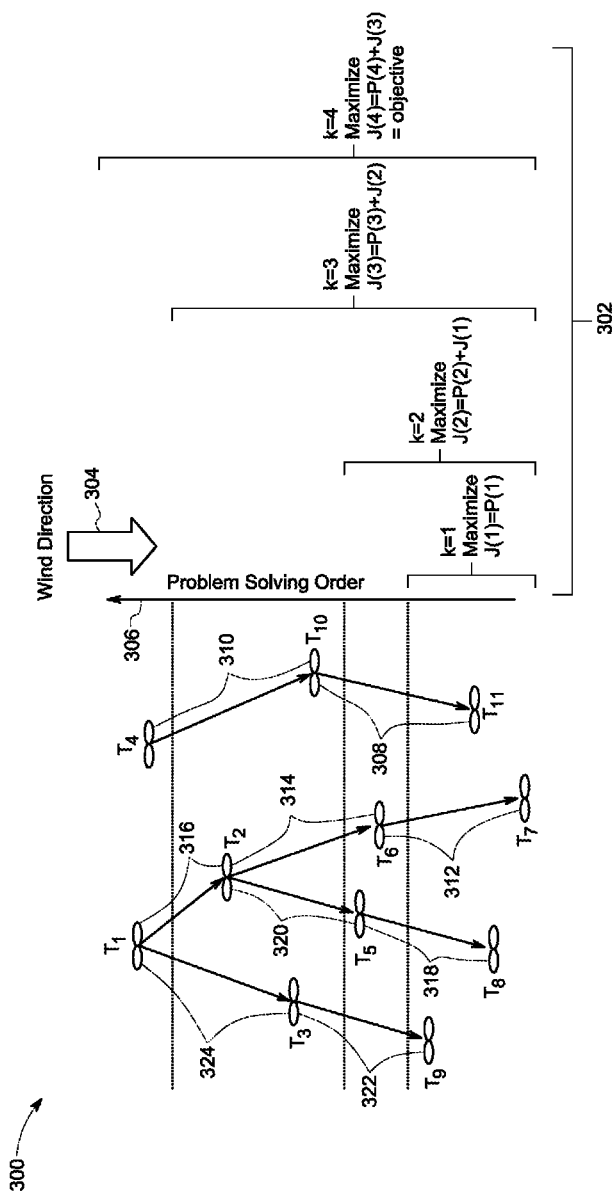
FIG. 3 is a schematic representation of an exemplary sequence for determining optimal control settings for sets of aerodynamically interacting wind turbines in a wind farm, according to embodiments of the present disclosure.

FIG. 3, for example, illustrates a schematic representation 300 depicting an exemplary sequence 302 of determining optimal control settings for aerodynamically interacting wind turbines $T_1$-$T_{11}$ in a wind farm. Specifically, FIG. 3 illustrates the plurality of wind turbines $T_1$-$T_{11}$ that may be classified into multiple sets 308-324 of interacting wind turbines based on a prevailing wind direction 304 and a geometrical layout of the wind farm. The sets 308-324 may be identified such that each set includes at least one upstream wind turbine that wakes at least one downstream wind turbine, as previously described with reference to steps 204 and 212 of FIG. 2.

In certain embodiments, the sets of interacting wind turbines 308-324, for example, may correspond to the new sets identified at step 212 of FIG. 2 and may be represented in a sparse tree-like structure. Furthermore, in one exemplary implementation, the farm control subsystem is configured to sequentially determine optimal control settings in a bottom-up approach such that optimal control settings for a downstream wind turbine are determined followed by optimal control settings for an upstream wind turbine in each of the new sets.

For example, when evaluating the set 308, the farm control subsystem determines suitable control settings for the most downstream wind turbine $T_{11}$ such that an individual power output $[J(1)=P(1)]$ of $T_{11}$ is maximized. In one embodiment, the wind speed observed at $T_{11}$ may be assumed to be equal to free stream wind (or a fixed arbitrary value) speed when determining the power output for a given control setting. Since the downstream wind turbine $T_{11}$ is positioned at the bottom of the wind farm in view of the particular wind direction 304, the downstream wind turbine $T_{11}$ experiences significant wake effects. Accordingly, initiating the optimization sequence 302 at the wind turbine $T_{11}$ allows for a substantial enhancement in the power output $P(1)$ of the wind turbine $T_{11}$ without having to account for operation of the upstream turbine $T_{10}$.

Subsequently, the farm control subsystem determines suitable control settings for the upstream wind turbine $T_{10}$ so as to maximize the combined power output $[J(2)=P(2)+J(1)]$ produced by the turbines $T_{10}$ and $T_{11}$ in view of the farm-level predictive wake model. In one embodiment, the control settings may be determined based on an assumption that the wind speed observed at $T_{10}$ is equal to the free stream wind speed, while the wind speed at $T_{11}$ is determined in view of the farm level predictive wake model. Moreover, for maximizing J(2), the farm control subsystem determines the effect of control settings corresponding to the upstream wind turbine $T_{10}$ on the power output produced by the downstream turbine $T_{11}$ [J(1)] based on the farm-level wake model and the control settings that have previously been determined for the downstream wind turbine $T_{11}$.

Additionally, for the set 310 including the wind turbines $T_{10}$ and $T_4$, the control settings for upstream wind turbine $T_4$ may be determined so as to maximize the combined power output $[J(3)=P(3)+J(2)]$ for the upstream turbine $T_4$, and the corresponding downstream turbines $T_{10}$, and $T_{11}$. Particularly, the control settings for the upstream turbine $T_4$ may be determined to maximize the power output $[J(3)]$ assuming the wind speed observed at $T_4$ to be equal to the free stream wind speed (or a fixed arbitrary value), and using the farm-level wake model and the control settings previously determined for the turbines $T_{10}$ and $T_{11}$ as constraints. Similarly, control settings for the sets of wind turbines positioned along the other branches of the sparse tree structure may be determined such that, at each positional level, the combined power output of the wind turbine at that level and preceding levels is maximized, in turn, maximizing the farm-level power output.

Occasionally, the control settings determined for certain wind turbines in the wind farm may result in one or more performance parameters of the wind turbines to fall outside permissible limits specified for a wind speed observed at the wind turbines. For example, a tip speed ratio and a pitch angle combination determined for a particular wind turbine may result in a power output that is greater than a rated limit for the wind speed observed at the wind turbine. In such a scenario, there may be a need to adjust the control settings, for example, reduce the tip speed ratio and/or increase the pitch angle until the power output is equal to the rated limit. Accordingly, once suitable control settings for all the wind turbines are determined as described with reference to FIG. 3, the control settings at a subset of the wind turbines may be re-adjusted for expected wind speeds at these wind turbines.

In one embodiment, such re-adjustment of the control settings for the subset of wind turbines may be performed in a top-down manner. For example, the control settings at the most upstream wind turbine in the sparse tree structure may be adjusted first followed by the control settings for subsequent downstream level wind turbines. The top-down adjustment allows for more efficient computations as an expected wind speed at each selected wind turbine may be calculated based on the wind speed measured at the most upstream turbine in the sparse tree structure and the control settings corresponding to all corresponding upstream turbines. The calculated wind speed, in turn, may be used to re-adjust control settings such that the performance of the selected wind turbine remains within permissible limits.

Such sequential determination and/or re-adjustment of the control settings for the wind turbines allows for set-wise resolution of the optimization problem, thus reducing the complexity and computational effort associated with the optimization of an overall farm-level performance goal. In certain embodiments, the farm-level optimization described with reference to FIGS. 2-3 may be continually implemented to ensure that the desired performance goals remain within designated limits.

Furthermore, in one embodiment, the present method may be implemented in a delayed optimization mode, where stored optimal control settings that were previously determined for historical values of selected combinations of wake parameters may not be continuously calculated, but may be used to adjust operations of the wind turbines in real-time. In certain embodiments, the stored control settings may be periodically updated in view of the varying ambient conditions at designated intervals of time, or when wake parameter values fall outside corresponding designated thresholds.

In an alternative embodiment, however, updates to the models may be accomplished in real-time to allow for a more accurate estimation of the prevailing wake conditions, in turn providing more accurate adjustments to the control settings for each wind turbine. Certain exemplary embodiments of delayed and real-time optimization of the wind farm operation will be described in greater detail with reference to FIGS. 4-5.

Figure 4:
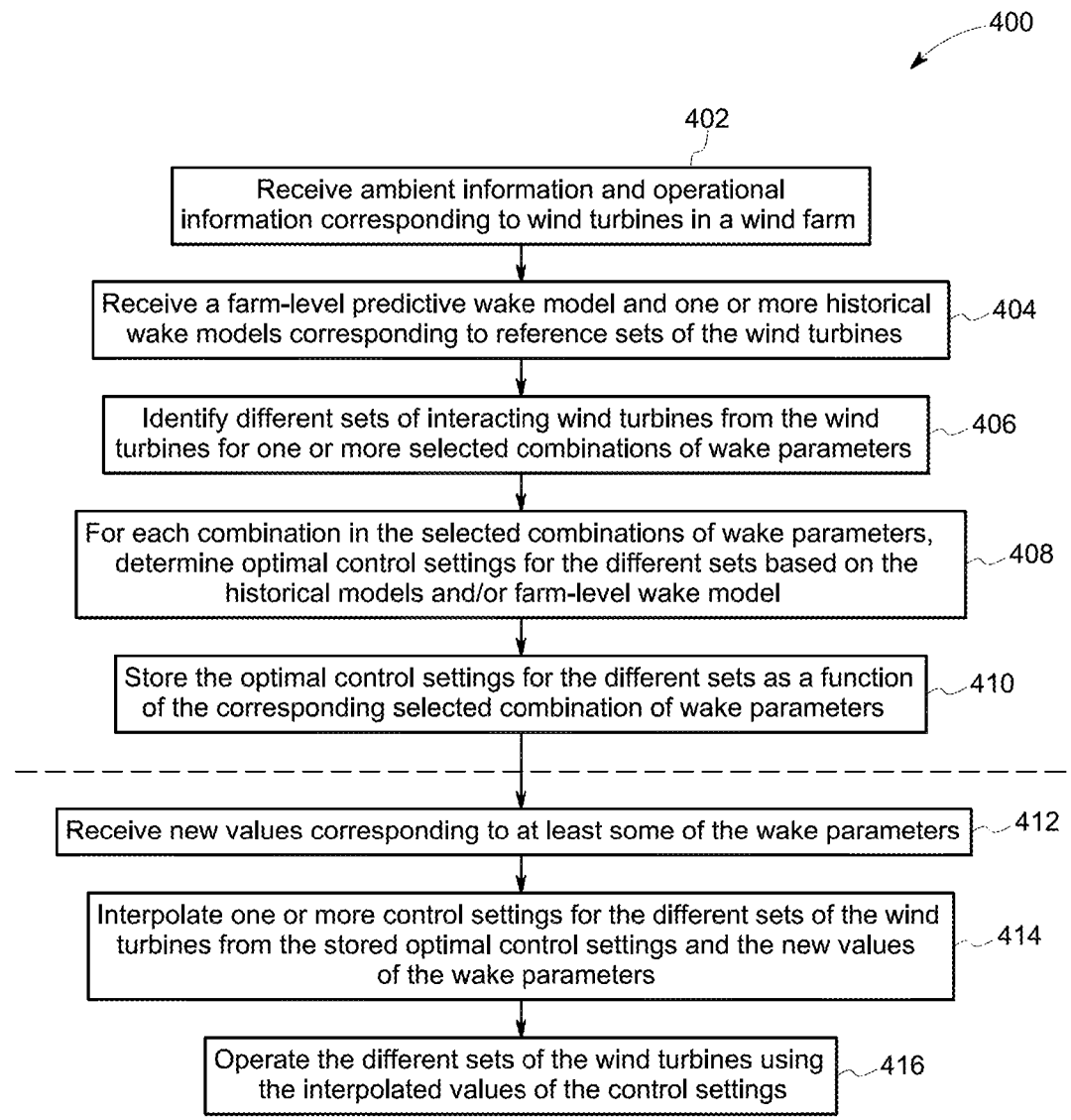
FIG. 4 is a flow chart illustrating an exemplary method for optimizing operation of a wind farm in a delayed optimization mode, according to embodiments of the present disclosure.

Particularly, FIG. 4 illustrates a flow chart 400 depicting an exemplary method for optimizing operation of a wind farm in a delayed optimization mode. The method begins at step 402, where ambient information and optionally operational information corresponding to a wind farm is received to be used in combination with geometrical information. Additionally, at step 404, farm-level predictive wake models and/or historical wake models corresponding to reference sets of the wind turbines are received.

Further, at step 406, different sets of interacting wind turbines may be identified from wind turbines for one or more selected combinations of wake parameters. In one embodiment, the selected combinations of the wake parameters include selected values of upstream wind speeds, downstream wind speeds, and selected wind directions. The wind speeds and directions, for example, may be selected from stored historical climate information that includes wind direction-binned frequency distributions of average wind speeds for the wind farm.

At step 408, for each combination of the selected combinations of wake parameters, optimal control settings are determined for the different sets of interacting wind turbines based on the historical wake models and/or the farm-level predictive wake model. Further, at step 410, the optimal control settings for the different sets are stored as a function of the corresponding selected combination of wake parameters in a storage repository. Alternatively, in one embodiment, the method described with reference to of FIG. 2 is performed or simulated in lieu of steps 402-408 for different combinations of wake parameters determine suitable control settings for the wind turbines in the wind farm. The resulting control settings determined over time may be recorded in memory to generate a suitable look up table that correlates the control settings to selected combinations of wake parameters. Particularly, once steps 402-410 have been completed, the look up table may be used for adjusting control settings in response to newly obtained values of the wake parameters.

At step 412, new values corresponding to at least some of the wake parameters are received. In one embodiment, the new values relate to wind speed, wind direction, and/or operational information for each of the wind turbines. The wind direction, in one example, corresponds to a median wind direction across all the wind turbines, and may be determined from yaw positions and/or using a wind vane. Moreover, in this example, the wind speed for the determined wind direction corresponds to a median wind speed over the upstream wind turbines. In certain embodiments, the wind speed may be estimated based on power, rotor speeds, and/or pitch of the wind turbines. Alternatively, the wind speed may be estimated using an anemometer.

Further, at step 414, one or more control settings for the different sets of the wind turbines may be interpolated from the stored optimal control settings and the new values of the wake parameters. In one embodiment, the new values, such as the wind speed and direction received at step 412, may be matched with stored values of a selected combination of wake parameters. In certain embodiments, a stored correlation such as the lookup table may be queried to identify the optimal settings stored as a function of the values of the wind speed and direction received at step 412. In case the look-up table does not include exact values of the wind speed and direction received at step 412, the farm control subsystem may be configured to interpolate optimal settings for each wind turbine from the stored optimal control settings corresponding to the closest wind speed and direction values.

At step 416, the different sets of interacting wind turbines are operated using the interpolated values of the control settings. In certain embodiments, the interpolated values of the control settings may be stored in the storage repository for subsequent optimizations. Additionally, in certain further embodiments, the optimal control settings originally stored in the storage repository may be updated from time to time based on the interpolated values to account for variations in turbine and/or farm-level performance values.

Such an offline optimization of the look up table may be used during operation of the wind farm to enable updates to the control settings in view of the constantly varying ambient conditions and limited instrumentation. However, the predetermined optimized look up table approach may provide only limited improvement in performance of wind farms having significant variations in farm terrain, frequently changing wind speeds and directions, and/or frequent occurrences of downtime of one or more of the wind turbines.

Figure 5:
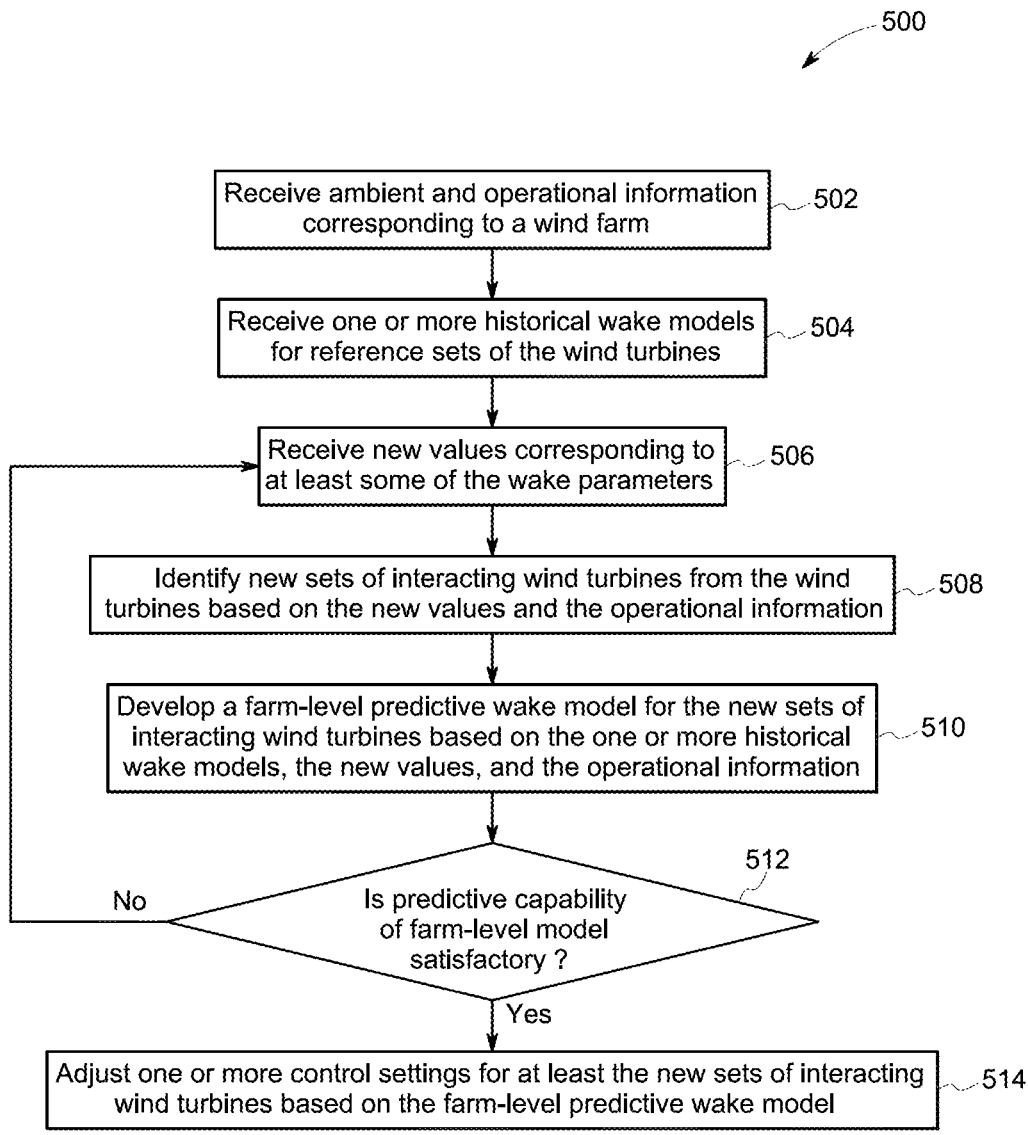
FIG. 5 is a flow chart illustrating an exemplary method for optimizing operation of a wind farm in real-time, according to embodiments of the present disclosure.

FIG. 5 illustrates a flow chart 500 depicting an exemplary method for optimizing operation of a wind farm, where the underlying wake models are adjusted in real time. As used herein, the term real time may be used to refer to a time lag of about one hour from collection of the operational information of the wind farm to adjustment of the wake models used for determining optimal control settings for the wind turbines. The method begins at step 502, where ambient information and optional operational information corresponding to a wind farm is received for use in connection with geographical information. In one embodiment, the ambient information includes a wind speed and direction detected at different wind turbines, whereas the operational information corresponds to operating and/or non-operating states of the wind turbines in the wind farm.

Further, at step 504, one or more historical wake models corresponding to reference sets of the wind turbines may be received. In one embodiment, the historical wake models may be determined using the method described with reference to the step 206 of FIG. 2.

Additionally, at step 506, new values corresponding to at least some of the wake parameters are received. Typically, the ambient conditions in the wind farm, such as wind speed and direction tend to continually vary over a day. The wake effects experienced in the wind farm, thus, may also vary throughout the day, thereby meriting continual updating of the wake model. Accordingly, in certain embodiments, the new values of wind speed, wind direction and operating and/or non-operating states of the wind turbines may be received at the farm control subsystem at designated intervals of time.

Generally, the wind conditions and turbine steady state performance in a wind farm are known to vary in approximately ten-minute intervals. Therefore, in one embodiment, the farm control subsystem may request the new values to be delivered after every ten minutes. Alternatively, the new values may be received at random intervals, upon receiving a user request, determining a significant change in consecutive measurements, and/or if a value of at least one wake parameter is outside a designated threshold.

Further, at step 508, new sets of interacting wind turbines are identified from the plurality of wind turbines based on the new values and the operational information. In one embodiment, the new sets may be identified using the method described with reference to steps 204 and 212 of FIG. 2. In addition, the operational state of each of the wind turbines in real-time is taken into account for identifying the new sets. Thus, if a wind turbine is not operational during a particular optimization period, the wind turbine will not contribute to the wake effect, and therefore, will not be considered while identifying the new sets. However, this wind turbine may be considered during another optimization period when the wind turbine is in active operation.

Additionally, at step 510, a farm-level predictive wake model is developed for the new sets of interacting wind turbines based on the one or more historical wake models, the new values, and the operational information. In one embodiment, the farm-level predictive wake model is developed using the method described with reference to step 214 of FIG. 2. In certain embodiments, developing the farm-level predictive wake model entails updating a previously determined farm-level wake model based on the new values and the operational information. The farm-level wake model, thus developed and/or updated, may then be used to predict values of desired performance parameters such as power output and/or fatigue loads experienced at different wind turbines in the wind farm.

However, frequent changes in the ambient conditions such as a sudden change in wind speed or direction, at times, may render the farm-level wake model developed at step 510 less relevant. Accordingly, at step 512, it may be determined if a predictive capability of the farm-level wake model developed at step 510 is satisfactory. To that end, the desired performance parameters for the wind turbines in the wind farm may be measured using sensors such as the monitoring devices 110 of FIG. 1. Further, the measured values may be compared with the values of the desired performance parameters predicted by the farm level wake model.

In one embodiment, if the predicted values of the desired performance parameters differ by more than a designated amount (for example, greater or lesser than 5%) from corresponding measured values, the predictive capability of the farm-level wake model may be determined to be unsatisfactory. Accordingly, control may pass to step 506 and the subsequent steps of the method of FIG. 5, which are repeated until predicted values of the farm-level power output and/or the fatigue loads substantially match the corresponding measured values, thereby signifying the accuracy of the farm-level wake model. In certain embodiments, the method of FIG. 5 may also be repeated after one or more designated intervals of time to allow for continual optimization of the wind farm operations in view of the frequent changes in the wake-causing ambient conditions.

When a difference between the predicted and measured values of the desired performance parameters is determined to be less than the designated amount, at step 514, one or more control settings for at least the new sets of interacting wind turbines are adjusted based on the farm-level predictive wake model developed at step 510. Particularly, the farm-level predictive wake model may be used to determine the control settings for each wind turbine such that a desired farm-level performance goal may be achieved. In one embodiment, for example, the control settings for one or more of the interacting wind turbines are adjusted sequentially and in a pair-wise manner such that the farm-level power output is maximized.

Embodiments of the present disclosure, thus, present a data-driven wake modeling approach that uses the real-time values of wake parameters for generating robust farm-level predictive wake models. In a more specific embodiment, the data-driven approach uses the monitored wake parameters to identify aerodynamically interacting sets of wind turbines and estimate corresponding (set-wise) wake interactions. The set-wise wake interactions, in turn, are used to generate accurate farm-level predictive wake models in real-time.

Figure 6:
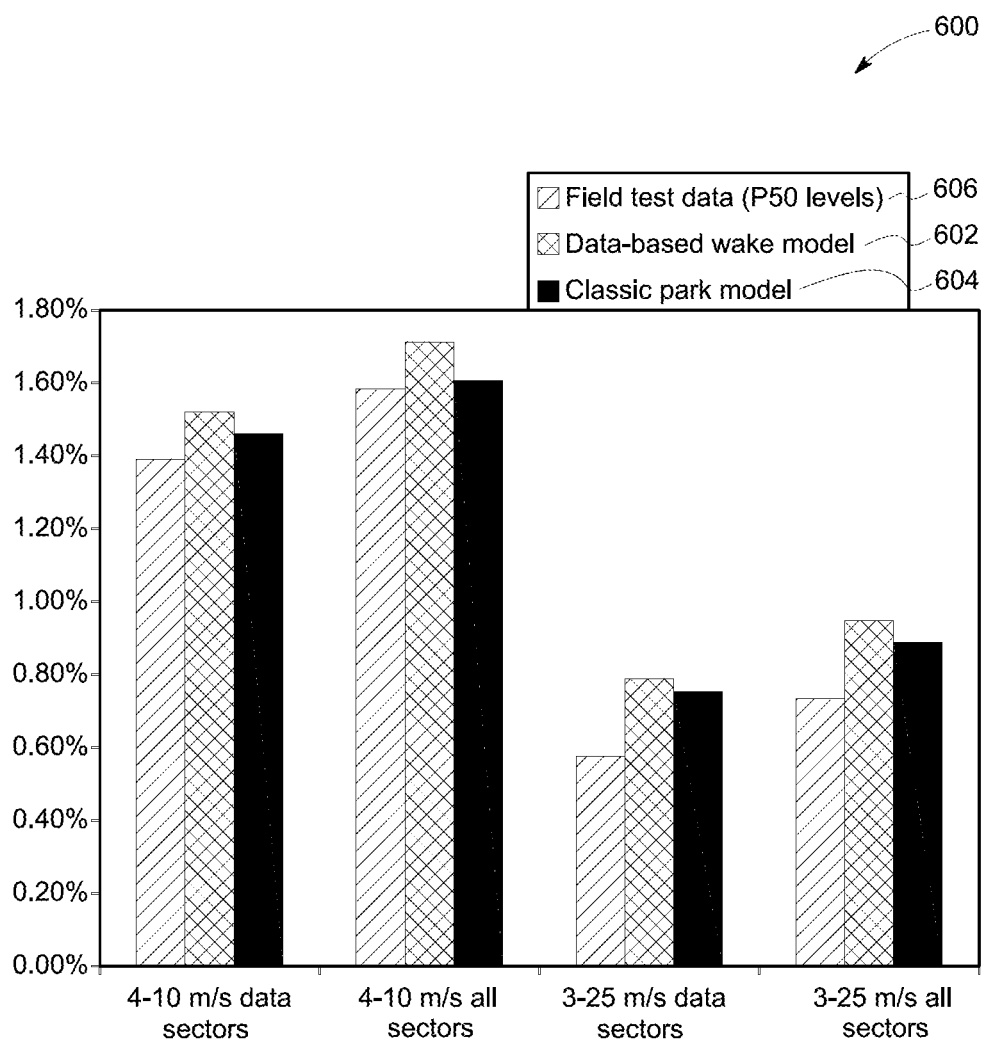
FIG. 6 is a graphical representation depicting a comparison of energy gains achieved using different wake models, according to embodiments of the present disclosure.

In one exemplary implementation, use of the present data-driven wake modeling approach resulted in a data correlation of greater than 60% as compared to conventional engineering wake models. FIG. 6, for example, illustrates a graphical representation 600 depicting a comparison of energy gains achieved using a baseline operation of a wind farm, a classic park model (an engineering wake model), and an embodiment of the present method described with reference to FIGS. 2-5. The data-driven wake modeling approach accounts for the continual variations in wake-causing ambient conditions such as wind speed, direction, intensity, and/or turbulence that the physics based engineering wake models are not able to capture accurately.

Accordingly, as evident from the depictions of FIG. 6, the present method provides higher energy gain 602 than the gain achieved using the engineering wake models 604 and/or the baseline operations 606. Particularly, use of prevailing ambient conditions and operational states of individual turbines allows capture of wake interactions being experienced in real-time at the downstream wind turbines, thereby allowing for determination of a more accurate farm-level predictive wake model. Additionally, determining the farm-level predictive wake model through the set-wise evaluation of the wake interactions reduces the computational effort, thus allowing for faster optimization of one or more selected performance goals for the wind farm. Specifically, the farm-level predictive wake model aids in determining optimal control settings for the different wind turbines in the wind farm so as to improve overall performance goals.

It may be noted that the foregoing examples, demonstrations, and process steps that may be performed by certain components of the present systems, for example by the turbine controllers 106 and/or farm control subsystem 108 of FIG. 1 may be implemented by suitable code on a processor-based system. To that end, the processor-based system, for example, may include a general-purpose or a special-purpose computer. It may also be noted that different implementations of the present disclosure may perform some or all of the steps described herein in different orders or substantially concurrently.

Additionally, the functions may be implemented in a variety of programming languages, including but not limited to Ruby, Hypertext Preprocessor (PHP), Perl, Delphi, Python, C, C++, or Java. Such code may be stored or adapted for storage on one or more tangible, machine-readable media, such as on data repository chips, local or remote hard disks, optical disks (that is, CDs or DVDs), solid-state drives, or other media, which may be accessed by the processor-based system to execute the stored code.

Although specific features of embodiments of the present disclosure may be shown in and/or described with respect to some drawings and not in others, this is for convenience only. It is to be understood that the described features, structures, and/or characteristics may be combined and/or used interchangeably in any suitable manner in the various embodiments, for example, to construct additional assemblies and methods for use in wind farm optimization.

While only certain features of the present disclosure have been illustrated and described herein, many modifications and changes will occur to those skilled in the art. It is, therefore, to be understood that the appended claims are intended to cover all such modifications and changes as fall within the true spirit of the invention.

We claim:

1. A method for optimizing operation of a wind farm, comprising:
   receiving historical values corresponding to at least some historic wake parameters for wind turbines in the wind farm;
   identifying reference sets of interacting wind turbines from the wind turbines based on the historical values;
   determining one or more historical wake models for the reference sets of interacting wind turbines based on the historical values;
   receiving new values corresponding to at least some new wake parameters for wind turbines in the wind farm;
   identifying new sets of interacting wind turbines from the wind turbines based on the new values;
   developing a farm-level predictive wake model for the new sets of interacting wind turbines based on the new values and the historical wake models;
   adjusting one or more control settings for at least the new sets of interacting wind turbines based on the farm-level predictive wake model; and
   controlling the new sets of interacting wind turbines based on the adjusted one or more control settings.

2. The method of claim 1, wherein determining the historical wake models comprises fitting the historical values corresponding to each of the reference sets of interacting wind turbines using to regression-based model.

3. The method of claim 1, wherein determining the historical wake models comprises computing a ratio of downstream wind speed to upstream wind speed as a function of wind direction at an upstream wind turbine, relative locations of upstream and downstream wind turbines, and the one or more control settings corresponding to the upstream wind turbine using the regression-based model.

4. The method of claim 1, wherein identifying the new sets of interacting wind turbines comprises using at least a subset of the new values and the geometrical layout of the wind farm.

5. The method of claim 1, wherein the receiving, the identifying, the developing, and the adjusting are performed at one or more designated intervals of time.

6. The method of claim 1, further comprising:
   continually monitoring the wake parameters for the wind turbines; and
   repeating the receiving, the identifying, the developing, and the adjusting when a change in a monitored value of one or more of the wake parameters is outside a corresponding threshold.

7. The method of claim 1, wherein different historical wake models are determined for different combinations of the wake parameters.

8. The method of claim 1, wherein the wake parameters comprise wind direction, wind speed at an upstream wind turbine, wind speed at a downstream wind turbine, wind turbulence, wind shear, wind veer, ambient temperature, pressure, humidity, or combinations thereof.

9. The method of claim 1, wherein the wake parameters comprise at least one of a tip speed ratio, a pitch angle, a yaw misalignment, and an operational state of each of the wind turbines.

10. The method of claim 1, wherein the wake parameters comprise geometrical layout information of the wind farm.

11. The method of claim 1, wherein adjusting the control settings comprises sequentially determining, the control settings for a downstream wind turbine followed by an upstream wind turbine in each of the new sets of interacting wind turbines to achieve one or more desired performance goals.

12. The method of claim 1, wherein adjusting the control settings comprises sequentially determining the control settings for each of the new sets of interacting wind turbines positioned in the wind farm in a sparse tree structure such that, at each positional level in the sparse tree structure, a combined power output of the wind turbines at that positional level and preceding positional levels in the sparse tree structure is maximized.

13. The method of claim 12, further comprising re-adjusting the control settings for a subset of the wind turbines if the control settings determined for the subset of the wind turbines results in a performance parameter that falls outside a permissible limit specified for a wind speed expected at the subset of wind turbines, wherein re-adjusting the control settings comprises sequentially determining the control settings for each of the subset of wind turbines in a top-down manner.

14. The method of claim 1, wherein achieving the desired performance goals comprises reducing fatigue loads on the wind turbines in the new sets of interacting wind turbines below a first threshold, increasing an annual energy production of the wind farm above a second threshold, or a combination thereof.

15. The method of claim 1, wherein each of the interacting sets of wind turbines comprises a pair of wind turbines.

16. A method for operating a wind farm, comprising:
   receiving historical values corresponding to at least some historic wake parameters for wind turbines in the wind farm;
   identifying reference sets of interacting wind turbines from the wind turbines based on the historical values;
   assembling historical wake models for the reference sets of interacting wind turbines in the wind farm based on historical values of selected combinations of wake parameters corresponding to the sets of interacting wind turbines;
   determining optimal control settings for each wind turbine in the sets of interacting wind turbines for each of the selected combinations of wake parameters based on the historical wake models;
   storing the optimal control settings for each wind turbine as a function of the selected combination of wake parameters;
   receiving new values of the wake parameters acquired over a subsequent period of time following acquisition of the historical values;
   determining the control settings for the wind turbines in each of a new sets of wind turbines using the new values and the stored control settings; and
   controlling the wind turbines in each of the new sets of wind turbines based on the determined control settings.

17. A system for optimizing operation of a wind farm, comprising:
   a plurality of wind turbines;

one or more monitoring devices configured to measure values of a plurality of wake parameters for one or more of the plurality of wind turbines; and a farm control subsystem operatively coupled to at least the monitoring devices and programmed to:

receive historical values corresponding to at least some historic wake parameters for the wind turbines in the wind farm;

identify reference sets of interacting wind turbines from the wind turbines based on the historical values;

determine one or more historical wake models for the reference sets of interacting wind turbines based on the historical values;

receive new values corresponding to at least some new wake parameters for wind turbines in the wind farm;

identify new sets of interacting wind turbines from the plurality of wind turbines based on the new values;

develop a farm-level predictive wake model for the new sets of interacting wind turbines based on the new values and the historical wake models;

adjust one or more control settings for at least the new sets of interacting wind turbines based on the farm-level predictive wake model; and control the new sets of interacting wind turbines based on the adjusted one or more control settings.

18. The system of claim 17, wherein the monitoring devices comprise rotor speed encoders, pitch angle encoders, electrical power transducers, anemometers, wind vanes, yaw position encoders, or combinations thereof.

19. The system of claim 17, wherein the farm control subsystem comprises a centralized processing system.

* * * * *

UNITED STATES PATENT AND TRADEMARK OFFICE
CERTIFICATE OF CORRECTION

PATENT NO. : 9,551,322 B2
APPLICATION NO. : 14/692115
DATED : January 24, 2017
INVENTOR(S) : Ambekar et al.

It is certified that error appears in the above-identified patent and that said Letters Patent is hereby corrected as shown below:

In the Specification

In Column 11, Line 37, delete "$\varphi_{up}$," and insert -- $\phi_{up}$, --, therefor.

In the Claims

In Column 19, Line 38, in Claim 2, delete "using to" and insert -- using a --, therefor.

In Column 20, Line 8, in Claim 11, delete "determining," and insert -- determining --, therefor.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*